United States Patent [19]

Barrett

[11] Patent Number: 5,749,067
[45] Date of Patent: May 5, 1998

[54] VOICE ACTIVITY DETECTOR

[75] Inventor: Paul Alexander Barrett, Ipswich, United Kingdom

[73] Assignee: British Telecommunications public limited company, London, England

[21] Appl. No.: 596,357

[22] Filed: Mar. 8, 1996

Related U.S. Application Data

[63] Continuation-in-part of Ser. No. 155,852, Nov. 23, 1993, abandoned.

[30] Foreign Application Priority Data

| | | | |
|---|---|---|---|
| Dec. 6, 1993 | [EP] | European Pat. Off. | 9324967 |
| Jun. 21, 1994 | [GB] | United Kingdom | 9412451 |
| Sep. 14, 1994 | [GB] | United Kingdom | 93307211 |

[51] Int. Cl.$^6$ .................... G10L 3/02; G10L 9/00
[52] U.S. Cl. ..................................... 704/233; 704/219
[58] Field of Search ............... 395/2.42, 2.17, 395/2.23, 2.25–2.28, 94

[56] References Cited

U.S. PATENT DOCUMENTS

| | | | |
|---|---|---|---|
| 4,227,046 | 10/1980 | Nakajima et al. | 395/2.37 |
| 4,283,601 | 8/1981 | Nakajima et al. | 395/2.42 |
| 4,358,738 | 11/1982 | Kahn | 381/94 |
| 4,672,669 | 6/1987 | DesBlache | 395/2.46 |
| 4,688,256 | 8/1987 | Yasunaga et al. | 395/2.42 |
| 4,696,039 | 9/1987 | Doddington | 395/2.24 |
| 4,700,392 | 10/1987 | Kato et al. | 395/2.42 |
| 4,731,846 | 3/1988 | Secrest et al. | 381/63 |
| 4,918,734 | 4/1990 | Muramatsu et al. | 395/2.23 |
| 5,103,481 | 4/1992 | Kawasaki et al. | 395/2.28 |
| 5,276,765 | 1/1994 | Freeman et al. | 395/2.42 |

OTHER PUBLICATIONS

Atal et al, "A Pattern Recognition Approach to Voice–Unvoiced–Silence Classification with Applications to Speech Recognition" IEEE Transactions on Acoustics, Speech, and Signal Processing, vol. ASSP–24, No. 3, Jun. 1976, pp. 201–202.

Rabiner et al, "Evaluation of a Statistical Approach to Voiced–Silence Analysis for Telephone–Quality Speech" The Bell System Technical Journal, vol. 56, No. 3, Mar. 1977, pp. 455–481.

Johnson et al, "Speech Detector" IBM Technical Disclosure Bulletin, vol. 22, No. 7, Dec. 1979, pp. 2624–2625.

Drago et al, Digital Dynamic Speech Detectors; IEEE Transactions on Communications, vol. COM–26, No. 1, Jan. 1978, pp. 140–145.

Buzo et al, "Speech Coding Based Upon Vector Quantization", IEEE 1980, pp. 562–574.

Rabiner et al, "Application of an LPC Distance Measure to the Voiced–Invoiced–Silence Detection Problem", IEEE Transaction on Acoustics, Speech, and Signal Processing, vol. ASSP–25, No. 4, Aug. 1977, pp. 338–343.

McAulay, "Optimum Speech Classification and Its Application to Adaptive Noise Cancellation", M.I.T. Lincoln Laboratory, Lexington, Massachusetts, pp. 425–426.

Un et al, "Improving LPC Analysis of Noisy Speech By Autocorrelation Subtraction Method", Department of Electrical Science Korea Advanced Institute of Science, Seoul Korea Central Research Lab., pp. 1082–1083.

ICASSP 81 Proceedings, Mar. 30, 31, Apr. 1981, Sheraton Atlanta Hotel, Atlanta, GA., pp. 1082–1083.

1977 IEEE International Conference on Acousics, Speech & Signal Processing, Held at the Sheraton–Hartford Hotel, Hartford Connecticut, May 9–11, 1977, pp. 427–428.

*Primary Examiner*—Allen R. MacDonald
*Assistant Examiner*—Patrick N. Edouard
*Attorney, Agent, or Firm*—Nixon & Vanderhye P.C.

[57] ABSTRACT

Speech is distinguished from noise by a spectral comparison of an input signal with a stored noise estimate. Updating of the noise estimate stored in a buffer is permitted during periods when speech is absent under control of an auxiliary detector. In order to improve operation in the presence of signals with strong harmonic components, e.g., signalling tones, an LPC prediction gain is computed from the input (x(i)) and a residual (y(i)) obtained from the input following filtering by a filter having a response complementary to the frequency spectrum of the input, and if the gain exceeds a threshold, buffer updating is suppressed.

18 Claims, 8 Drawing Sheets

VOICE ACTIVITY DETECTOR

CROSS REFERENCES TO RELATED APPLICATIONS

This application is a continuation-in-part of our, commonly assigned application Ser. No. 08/158,852 filed Nov. 29, 1993, now abandoned. It is also related to our application Ser. No. 08/232,475 filed Apr. 25, 1994, now abandoned.

A voice activity detector is a device which is supplied with a signal, with the object of detecting periods of speech, or periods containing only noise. Although the present invention is not limited thereto, one application of particular interest for such detectors is in mobile radio telephone systems where the knowledge as to the presence or otherwise of speech can be exploited to reduce power consumption and interference by turning off a transmitter during periods of silence. Here also the noise level (from a vehicle-mounted unit) is likely to be high. Another possible use in radio systems is to improve the efficient utilisation of radio spectrum.

BACKGROUND OF THE INVENTION

FIG. 1 shows a voice activity detector as described in our International Patent Application WO89/08910.

Noisy speech signals are received at an input 1. A store 2 contains data defining an estimate or model of the frequency spectrum of the noise; a comparison is made (3) between this and the spectrum of the current signal to obtain a measure of similarity which is compared (4) with a threshold value. In order to track changes in the noise component, the noise model is updated from the input only when speech is absent. Also, the threshold can be adapted.

In order to ensure that adaptation occurs only during noise-only periods, without the danger of progressive incorrect adaptation following a wrong decision, adaptation is performed under the control of an auxiliary detector 7, which comprises an unvoiced speech detector 8 and a voiced speech detector 9: the detector 7 deems speech to be present if either of the detectors recognises speech, and suppresses updating and threshold adaptation of the main detector. Typically the unvoiced speech detector 8 obtains a set of LPC coefficients for the signal and compares the autocorrelation function of these coefficients between successive frame periods, whilst the voiced speech detector 9 examines variations in the autocorrelation of the LPC residual.

This arrangement is very successful in distinguishing between periods of speech and periods during which only noise is received. However, a problem arises in that signalling tones are often assumed by the auxiliary detector to be simply noise (i.e. it does not recognise them as speech) so that the main detector adapts to the tones as if they were noise, and transmission of the tones is prevented, or at least terminated prematurely.

This problem could be overcome by provision of tone detectors each tuned to the frequency(s) of a particular signalling tone; however, the diversity of different signalling tones throughout the world is considerable, so that a large number of individual detectors would be needed in order, for example, that a mobile telephone user making an international call may be able to hear the 'engaged' tone reliably, irrespective of the country from which it originates.

BRIEF DESCRIPTION OF THE INVENTION

According to the present invention, there is provided a voice activity detector for detecting the presence of speech in an input signal, comprising (a) means for storing an estimate of the noise component of an input signal;

(b) means for recognising the spectral similarity of the input signal and the stored estimate to produce an output decision signal;

(c) means for updating the stored estimate;

(d) an auxiliary detector arranged to control the updating means so that updating occurs only when speech is indicated by the auxiliary detector to be absent from the input signal;

characterised by means operable to calculate a prediction gain parameter for the in-out signal, and modifying means arranged to suppress updating in the event that the prediction gain exceeds a threshold value.

Some embodiments of the invention will now be described, by way of example, with reference to the accompanying drawings, in which:

DESCRIPTION OF THE PREFERRED EMBODIMENTS

Figure 1:
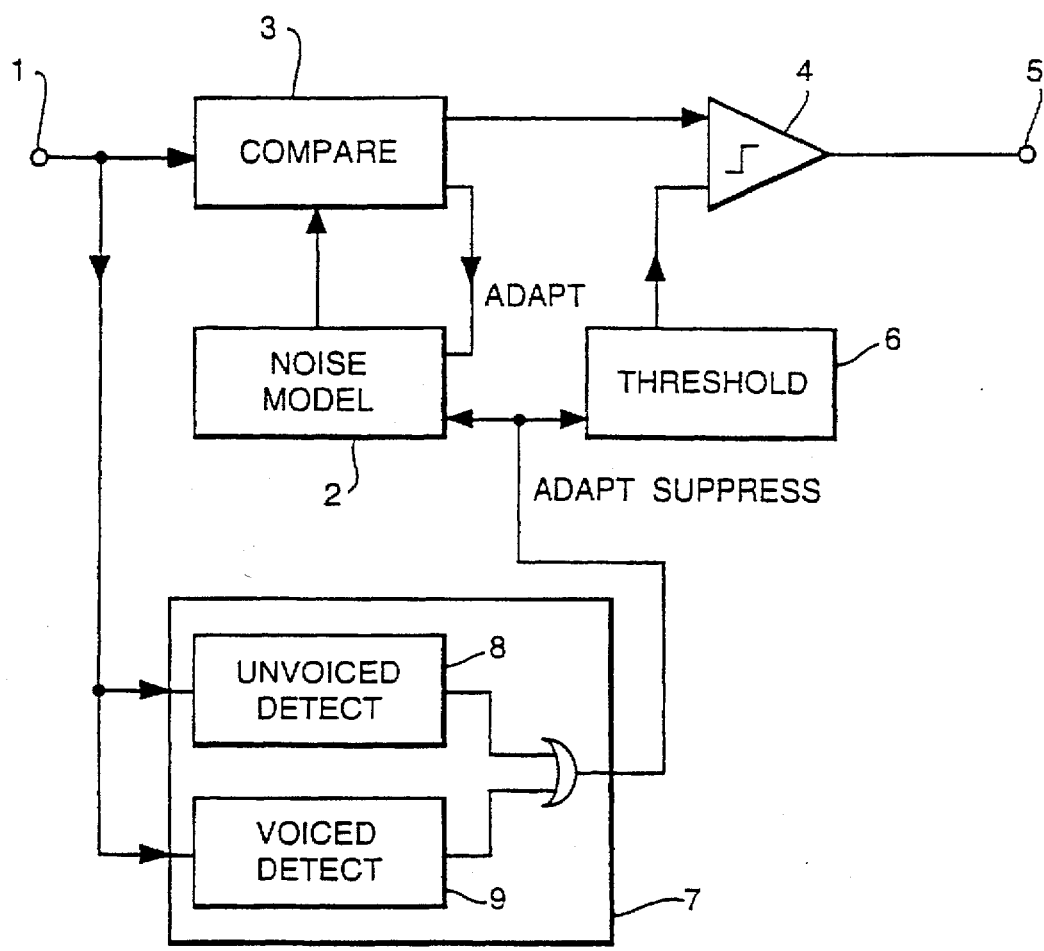
FIG. 1 illustrates a voice activity detector.
Figure 2:
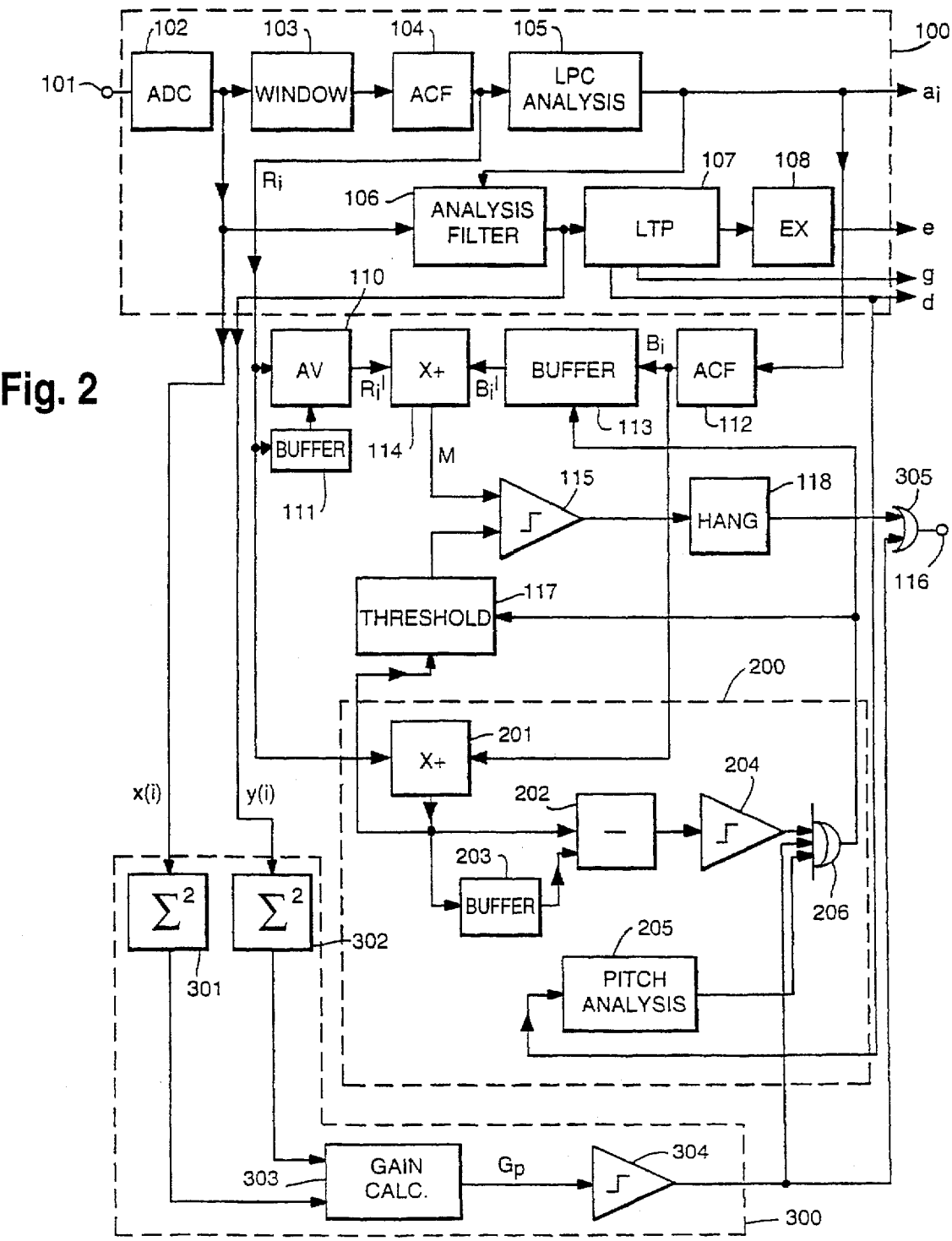
FIG. 2 is a block diagram of a speech coder with a voice activity detector in accordance with one aspect of the present invention.

In FIG. 2, a conventional speech coder 100 has a speech input 101, the speech signal being sampled at 8 kHz and converted into digital form by an analogue-to-digital converter 102. A windowing unit 103 divides the speech samples into frames of (for example) 160 samples (i.e. a 20 ms frame) and multiplies it by a Hamming window or other function which reduces the contribution of samples at the beginning and end of the frame. A correlator 104 receives the digitised speech samples and produces the autocorrelation coefficients $R_i$ for each frame. An LPC analysis unit 105 calculates the coefficients $a_i$ of a filter (sometimes referred to as a synthesis filter) having a frequency response corresponding to the frequency spectrum of the input speech signal using a known method e.g. a Levinson-Durbin or Schurr-algorithm.

The digitised input signal is also passed through an inverse filter (or analysis filter) 106 controlled by the coefficients, to produce a residual signal which is further analysed by a long term predictor analysis unit 107 which computes the optimum delay for predicting the LPC residual from its previous values, and a corresponding gain value for the prediction. The analysis unit 106 also forms a second residual (i.e. the difference between the current LPC residual and the LPC residual when delayed and scaled by the parameters obtained). An excitation unit 108 derives excitation parameters for transmission to a decoder, by simply quantisising the LTP residual, or by other conventional means.

The LPC coefficients $a_i$, the long term predictor delay d and gain g, and excitation parameters e are transmitted to a decoder.

A main voice activity detector in accordance with our earlier patent application averages the autocorrelation coefficients $R_i$ by means of an averager 110 which produces a weighted sum $R_i'$ of the current coefficients and those from previous frames stored in a buffer 111. A further autocorrelator 112 forms the autocorrelation coefficients B of the LPC coefficients $a_i$ which are passed to a buffer 113. The contents of the buffer are updated only during periods deemed by an auxiliary detector (to be described below) to contain only noise, so that the contents of the buffer 113 $B_i'$ represent an estimate of the noise spectrum of the input signal. A multiplication/addition unit 114 forms a measure M of the spectral similarity between the input signal and the noise model defined as $$M = B'_0 + 2 \sum_{i=1}^{n} \frac{R'_i B'_i}{R'_0}$$

Where a zero suffix signifies the zero order autocorrelation coefficient and n is the number of samples in a speech frame.

The measure M is compared in a comparator 115 against a threshold level and produces at an output 116 a signal indicating the presence of absence of speech. The threshold may be adaptively adjusted (117) according to the current noise power level. Hang unit 118 may be provided to measure the duration of the indications of speech and when the presence of speech in indicated for a period in excess of a predetermined time constant, the output is held high for a short period. This avoids clipping of the middle of low level speech bursts.

The updating of the noise estimate in the buffer store 113 is not controlled by the output 116 of the detector just described, since failure to recognise speech would result in updating of the buffer with speech information and consequent further recognition failures—a "lock" situation. Therefore updating is controlled by an auxiliary detector 200. In order to distinguish between noise and unvoiced speech, this forms (201) a sum of products of the (unaveraged) autocorrelation coefficients Ri of the input and the (unbuffered) autocorrelation coefficients Bi of the LPC coefficients. A subtractor 202 compares this sum with the corresponding sum for a previous speech frame, delayed in a buffer 203. This difference representing the spectral similarity between successive frames of the input signal is thresholded (204) to produce a decision signal.

For recognising voiced speech, the long term predictor delay d is measured by a pitch analysis unit 205. The output of this is combined with that of the thresholding stage 204 in an OR gate 206—i.e. speech is deemed by the auxiliary detector 200 to be present if either (or both) of the units 204 or 205 produces an output indicating that speech is present. As discussed in the introduction, if a system is to pass signalling tones, these must be recognised as speech rather than as noise, and the auxiliary detector just described is not very effective at achieving this. Although it recognises some tones, others (generally those with a relatively pure spectral content) are not recognised. Once the auxiliary detector 200 has failed, the main detector also fails since the noise estimate in the buffer 113 is then "trained" on the signalling tone.

Accordingly, a further auxiliary detector is provided for the detection of signalling tones. Preferably this makes use of the observation that signalling tones, being artificially generated, contain a small number of frequency components (which may be modulated). The performance of an LPC predictor is exceptionally high for such signals, and this is made use of to discriminate between tone-based signals (including multi-tone signals) and background or environmental noise signals.

The LPC prediction gain Gp is defined as the ratio of the input signal power to the output signal power for a frame of speech viz is $$Gp = \frac{\sum_{i=0}^{n-1} x^2(i)}{\sum_{i=0}^{n-1} y^2(i)}$$

where $x_i$ is the filter input and $y_i$ is the output of the inverse filter:

$$y(t) = x(t) + \sum_{i=1}^{m} y(t-i)a_i$$

(where m is the number of filter coefficients, typically 8 or 10). Signals x(i) and y(i) are available from the LPC coder 100, at the outputs of converter 102 and filter 106 respectively. These values are squared (301, 302) and the prediction gain is obtained by an arithmetic unit 303 which calculates Gp according to the above equation. Its output is compared by a comparator 304 with a fixed threshold value T; if the gain exceeds the threshold (typically T=63 or 18 dB), a tone is considered to be recognised. There are several possible responses to tone recognition:

(a) to override the main detector output by means of an OR gate 305

(b) to override the auxiliary detector by means of a third input to the OR gate 206

(c) both of these (as shown)

Figure 3:
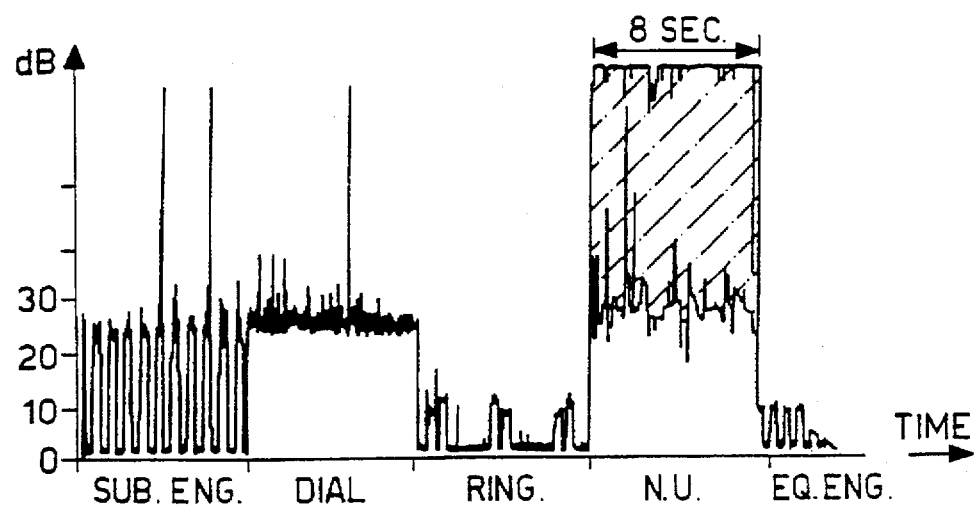
FIGS. 3 and 4 show graphically prediction gain values from various input signals.
Figure 4:
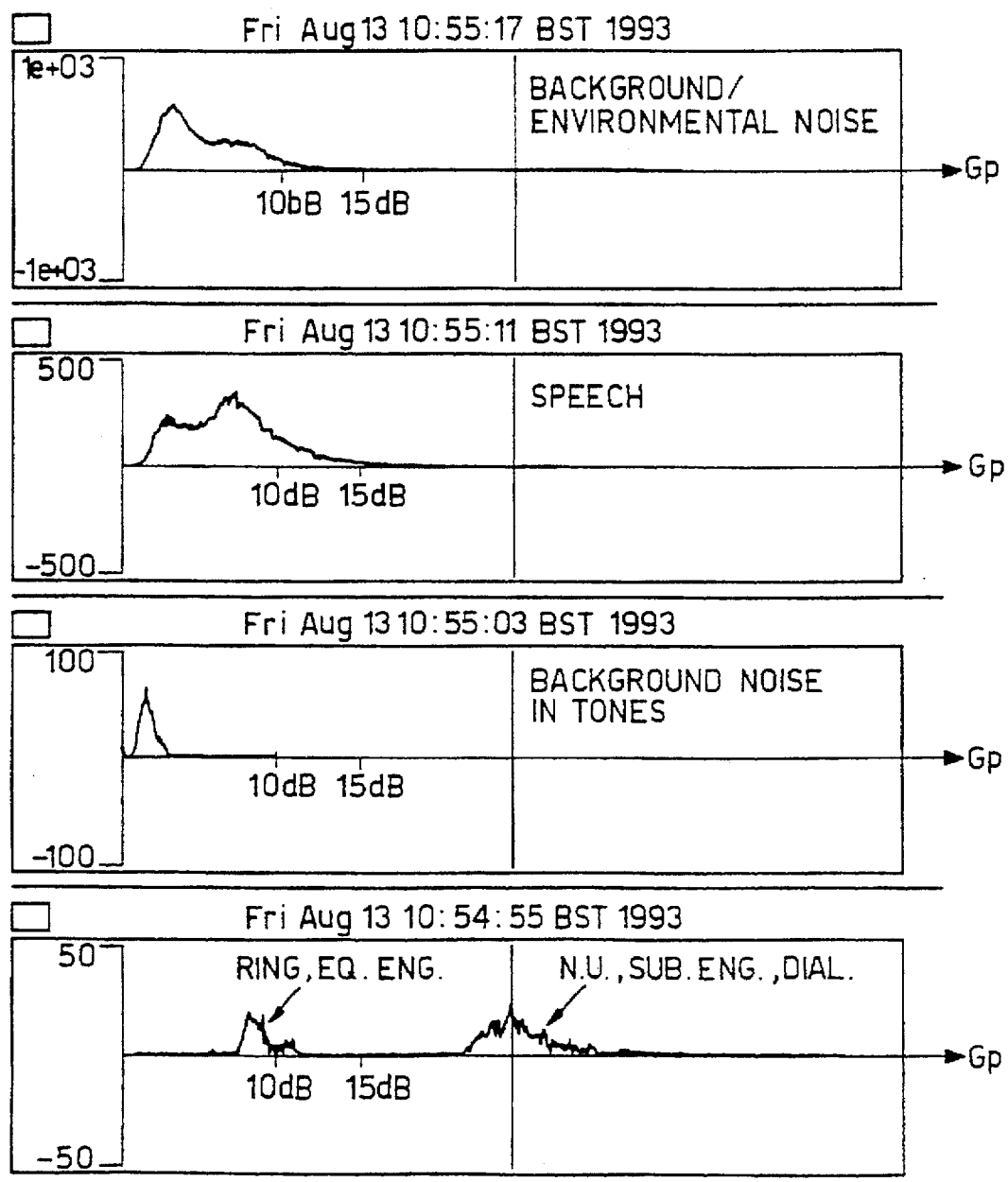

Of course, instead of calculating the quotient, the $\Sigma x^2$ term can be compared with the $\Sigma y^2$ multiplied by the threshold value. FIG. 3 shows histograms of prediction gains in dB obtained from background environmental noise, speech, background noise in signalling tones, and the signalling tones themselves, whilst FIG. 4 shows plots of prediction gain against time for different UK signalling tones, viz.

'Subscriber Engaged' tone

Dial tone

Ring tone

'Number Unobtainable' tone

'Equipment engaged' tone

In practice, subscriber engaged tone, dial tone and 'number unobtainable' tone are successfully recognised by the further detector, as indeed are multifrequency tones (e.g. from a keypad). Ring tone and 'equipment engaged' tone are recognised by the pitch analysis unit 205.

The further detector 300 may be considered as a detector for certain types of tone; alternatively (in the embodiment of FIG. 2) it may be viewed as detecting a situation where the residual $y_i$ is small, so that operation of the long term predictor 107 (and hence of the pitch analysis 205) is not robust.

An alternative option for detecting voiced speech is to replace the pitch detector 205 with items analogous to 301, 302, 303 and 304 to form (and threshold) a prediction gain based on the longterm predictor analysis 107.

Two further modifications to the apparatus of FIG. 2 will now be described with reference to FIG. 5. Firstly, in the embodiment showing in FIG. 2, the prediction gain calculated is that of the LPC analysis of the speech coder 100, which might typically employ an 8th or even 10th order predictor. However, noting that the basis of this part of the analysis is that Information tones result in higher prediction gains than does environmental noise, and that the higher the order of the analysis the higher is the ability of the predictor to model the noise environment, it is found that, by limiting the gain calculation to a fourth order analysis, information signals consisting of one or two tones give a high prediction gain whilst the prediction gain for environmental noise can be reduced.

In principle this could be achieved by providing a fourth order analysis and filter alongside the eighth-order units 105, 106, to feed the auxiliary detector. However it is simpler to compute the prediction gain from reflection coefficients (sometimes referred to as Parcor coefficients). In FIG. 5 these are calculated in known manner by a unit 400 from the autocorrelation coefficients $R_i$ (though, depending on the design of the speech coder it might be possible to pick them up from an intermediate point with the LPC analysis unit 105). A measure of the prediction gain can be obtained by computing from the first four reflection coefficients $Rc_i$ a prediction error Pe, as follows.

$$Pe = \prod_{i=1}^{4} (1 - Rc_i^2)$$

this being performed at 401. A high prediction error corresponds to a low prediction gain and vice versa, so that a signalling tone is deemed to be present if Pe is less than a threshold value Pth. This comparison 403 replaces comparison 304 of FIG. 2.

Secondly, noise in a mobile radio environment contains very strong resonances at low frequencies, and a further test is made to determine whether the "tone" is below a threshold frequency. Selection of a threshold involves a degree of compromise but, since most signalling tones lie above 400 Hz, 385 Hz is suggested.

This further zest operates by determining the frequencies of the poles of the LPC filter. A low order filter is preferred to reduce the complexity of analysis. Again, a further LPC analysis could be performed but it is easier to proceed as in FIG. 5, by computing the LPC coefficients from the reflection coefficients. Supposing that only the first two reflection coefficients from unit 400 are used, then the LPC coefficients $a_i$ are calculated in conventional manner by a unit 404, being defined such that the synthesis filter response is $$H(z) = 1/\{a_0 + a_1 z^{-1} + a_2 z^{-2}\}$$

Then the positions of the poles in the z-plane are given by the solution to the quadratic equation:

$$a_0 z^2 + a_1 z + a_2 = 0 \quad a_0 = 1$$

$$z = \frac{-a_1}{2} \pm j\sqrt{\frac{4a_2 - a_1^2}{4}}$$

i.e.

If the term inside the square root is negative then the pole lies on the real axis and the signal is not a tone. If it is positive, but the real part of the pole position is negative (i.e. $a_1 < 0$) then the pole is in the left-hand half of the z-plane. This necessarily implies that the frequency is more than 25% of the sampling rate—i.e. above 2000 Hz for a sampling frequency $f_s$ of 8 kHz, in which case the frequency calculation is unnecessary and a ">385" signal can be generated right away.

The pole frequency is given by:

$$f = \arctan\left\{\frac{-\sqrt{4a_2 - a_1^2}}{a_1}\right\} \times \frac{f_s}{2\pi}$$

The condition that f<385 Hz can be written (avoiding square roots) as:

$$(4a_2 - a_1^2)/a_1^2 < \tan^2\left\{\frac{2\pi \times 385}{f_s}\right\}$$

OR $$(4a_2 - a_1^2)/a_1^2 < 0.0973 \text{ at } f_s = 8\text{kHz}$$

This calculation is performed by unit 405.

Its output is combined in an and-gate 406 with that of he comparator 403 so that a 'tone' decision is produced only when both the prediction gain is high and the pole frequency is greater than 385 Hz.

If desired, pole Frequencies above 2000 Hz (or some other upper limit) may also be trapped so that high-frequencies above the expected signalling tone range may not be recognised as tones.

If the extra computation in solving a quartic equation can be accommodated, then it is possible to use the third and fourth reflection coefficients too; in this case two complex conjugate pairs of poles—with two associated frequencies could potentially be identified, it being envisaged that a tone would not be considered to be present if both frequencies were below the threshold.

Figure 5:
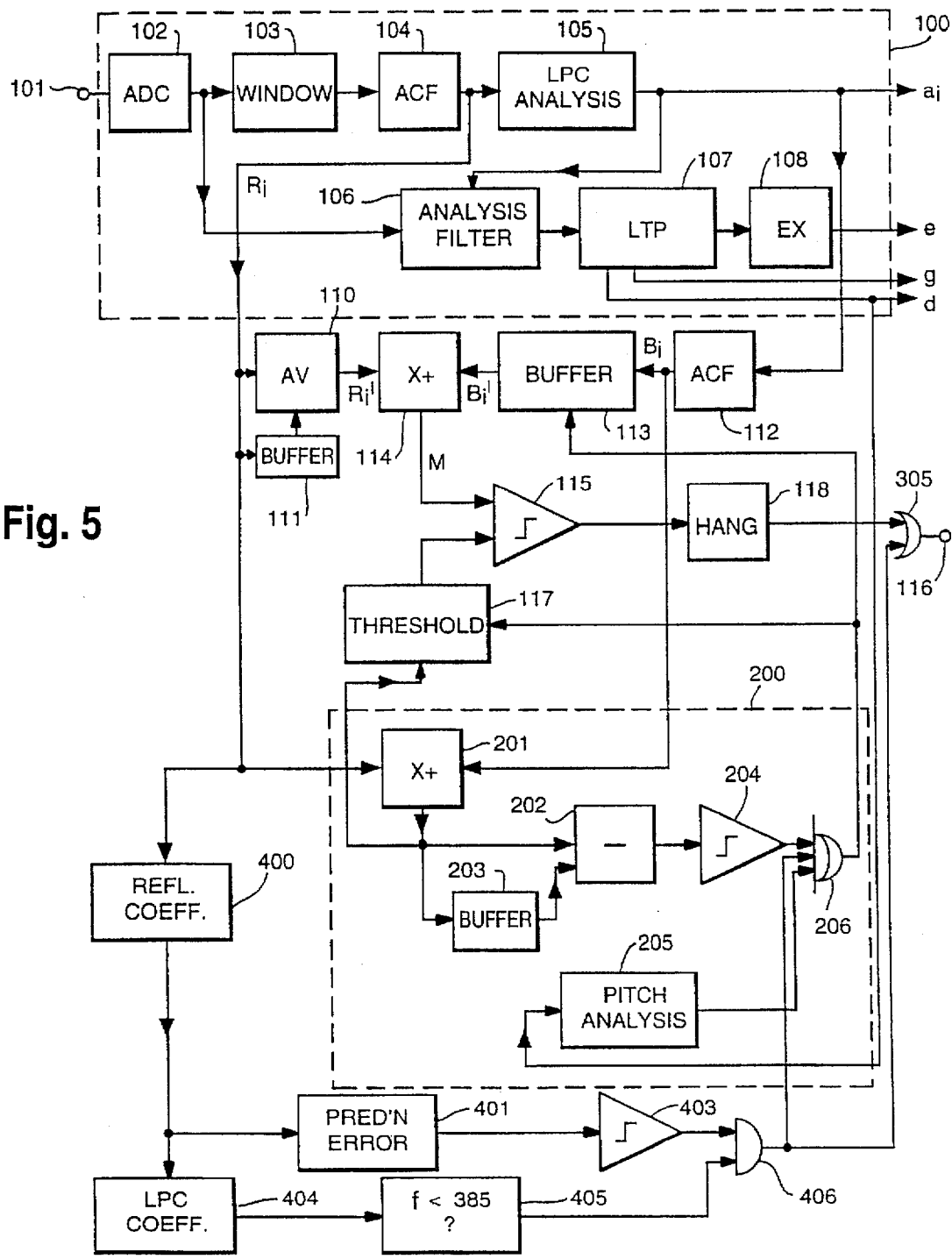
FIGS. 5, 6, 7 and 8 are block diagrams of further embodiments of the inventor.
Figure 6:
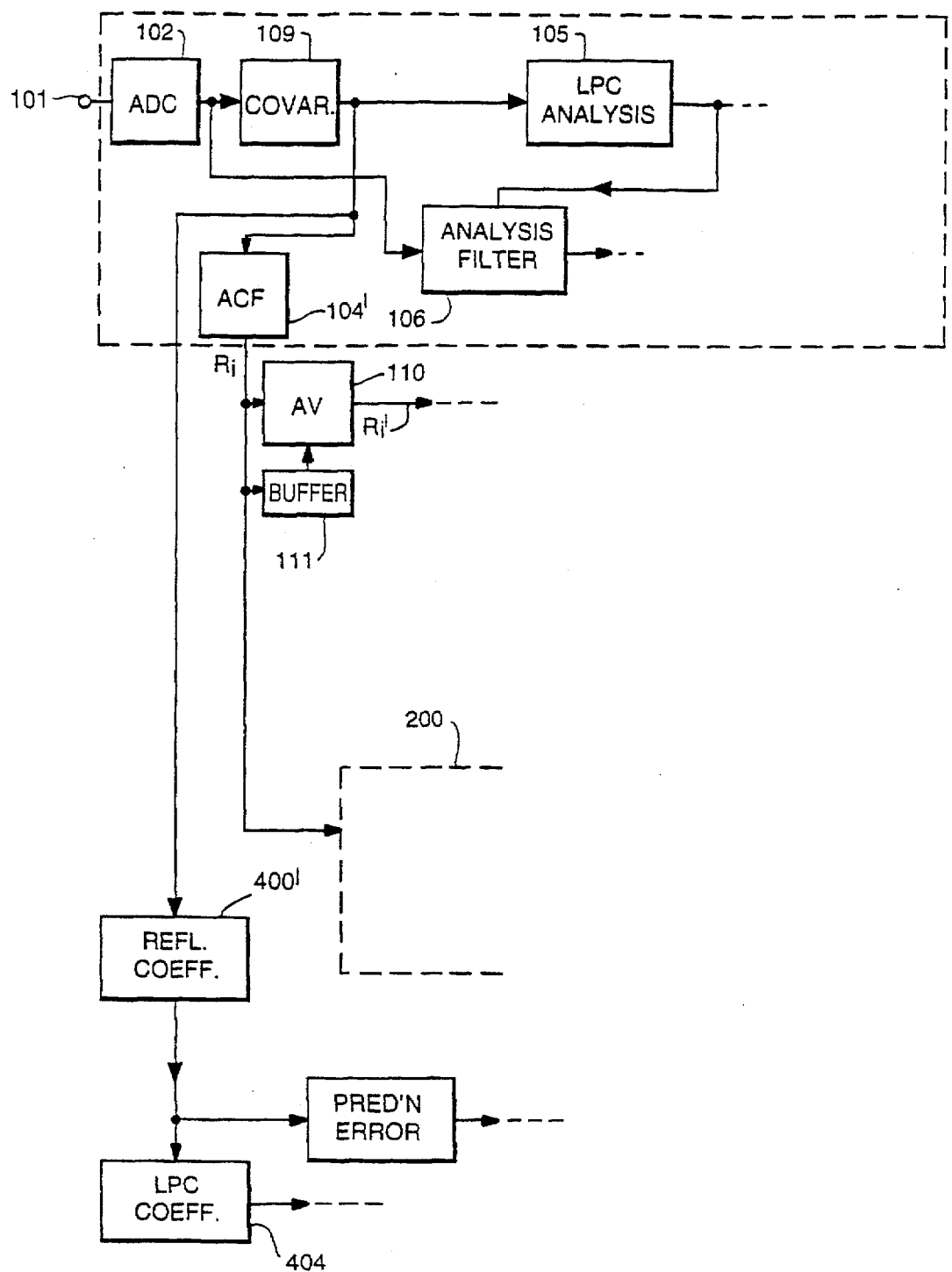

It has already been mentioned that the embodiments of FIGS. 2 and 5 employ a Hamming window prior to the autocorrelation calculation 103 (as is common with autocorrelation-based LPC analysis). If it is desired not to perform such windowing in the speech coder, then a possible alternative is in the case of FIG. 5 to omit the windowing 103 and to replace the reflection coefficient calculation 400 by a conversion of autocorrelation values into covariance values, units 401, 404 being modified to use covariance values rather than reflection coefficients. Alternatively, as shown in FIG. 6 (which shows only those parts which have change relating to FIG. 5), the initial processing may be by means of a covariance analysis 109, the output of which is supplied to a reflection coefficient calculator 400' and a modified autocorrelation coefficient unit 104'. The LPC analysis unit 105 may be connected as before to the auto-correlation unit 104' or—as shown—directly to the covariance analysis unit 109.

The above-described 'tone-detection' embodiments produce good results; they may, however, fail on mechanically generated tones employed in some territories, as these tend to have a high harmonic content resulting in low prediction gain. Simply filtering out the higher harmonics is not a solution since the insertion of a filter tends to increase the autocorrelation of all signals and hence higher prediction gains for other signals too. It is found that the predictor tends to model the filter poles rather than the characteristics of the input signal. We have however discovered that good results can be obtained using filtering if the prediction gain analysis can be constrained to assess the predictability of the signal only within a frequency range corresponding to the passband of the harmonic filter. This can be achieved by subsampling the signal at a frequency of twice the filter bandwidth prior to the prediction gain analysis.

Figure 7:
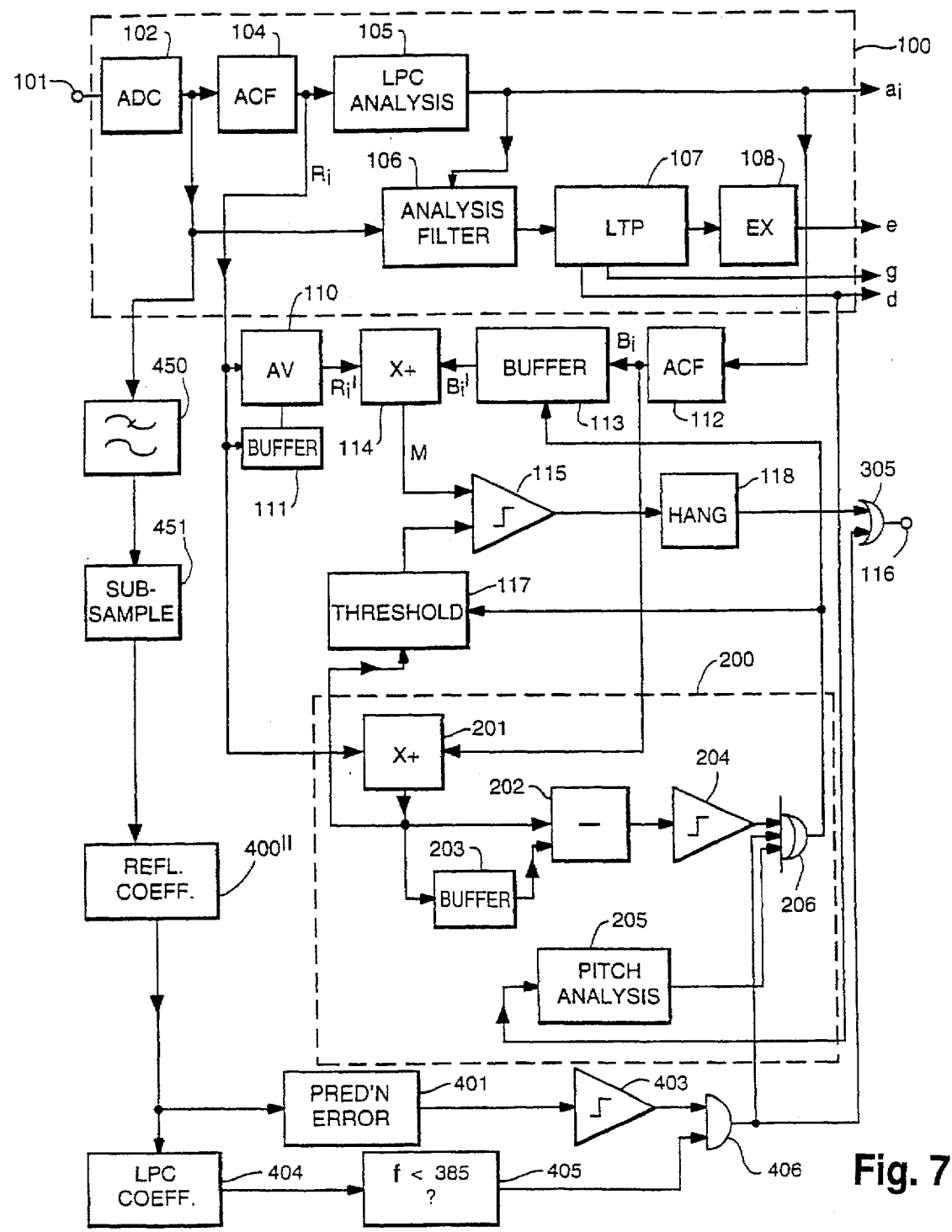

Thus the embodiment of FIG. 7, similar in other respects to FIG. 5, employs filter 450, this is a low pass equiripple FIR filter having zeros on the unit circle having a passband up to 600 (3 dB point) and having a stopband attenuation of 20 dB at 1200 Hz. It is thought preferable that the stopband attenuation not be too great. The filter output is subsampled at 1200 Hz in subsampling unit 451.

With this filtering applied, the opportunities for the tone detection to share components with the speech coder 100 are of course much reduced; thus the filter 450 is fed directly with the digitised input signal from the analogue-to-digital converter 102, and feeds a reflection coefficient analysis unit 400", or covariance or autocorrelation analysis as discussed earlier. The autocorrelation option will require windowing as explained above.

Another embodiment alleviates the "harmonics" problem without unduly limiting the frequency range of prediction gain analysis; this is achieved by using filters to divide the signal into two or more frequency bands each of which is narrow enough that it cannot contain both the fundamental and the third harmonic of a tone. Each channel is then subsampled and subjected to a separate prediction gain analysis.

Figure 8:
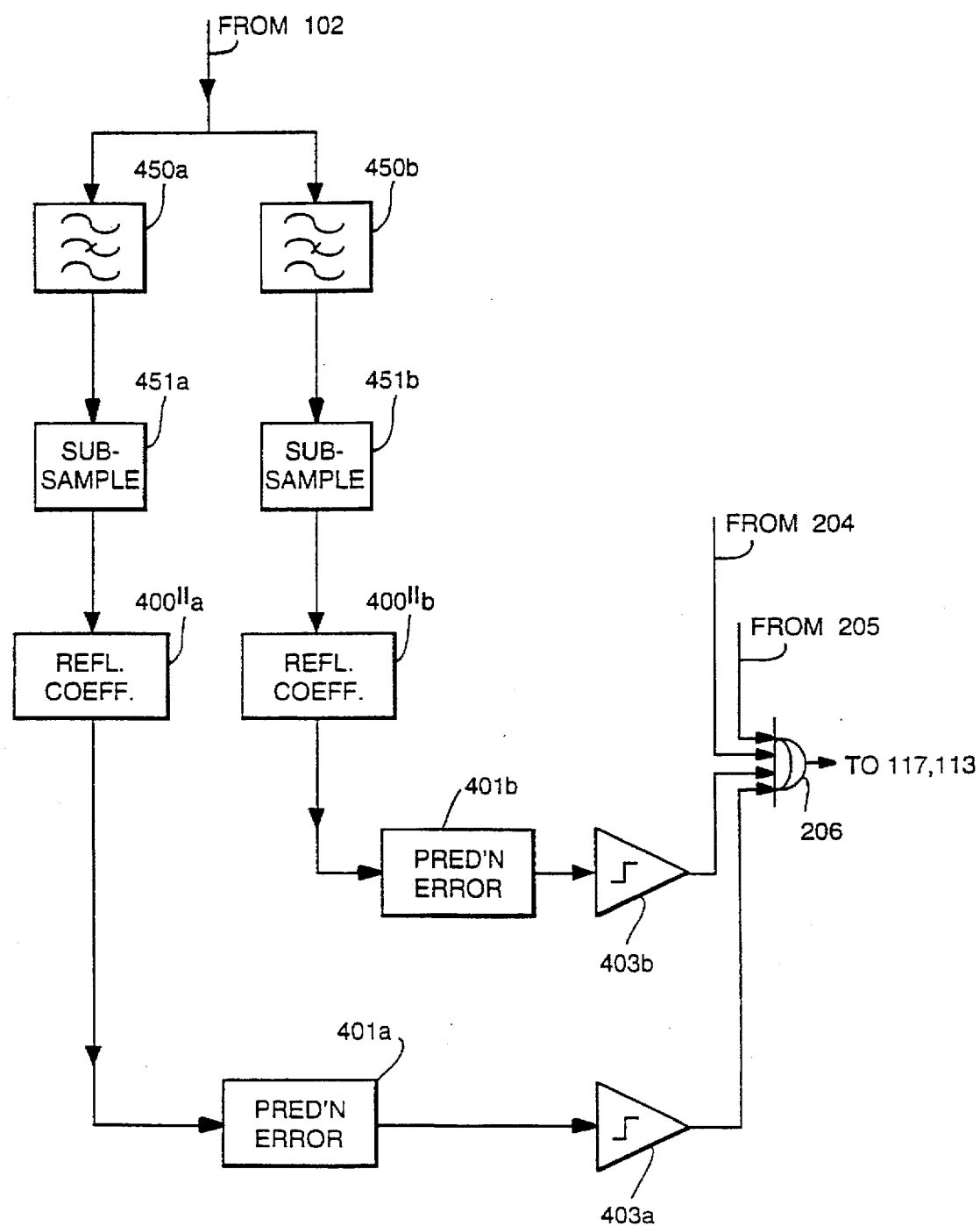

Thus in FIG. 8, the signal is divided into frequency bands 400–1200 Hz and 1200–2000 Hz by filters 450a, 450b, and subsampled at 1.6 kHz (451a, 451b). Reflection coefficient computation 400"a,b, prediction error analysis 401a,b and thresholding 403a,b are performed separately for the two bands. The two outputs from comparators 403a, 403b are conducted to separate inputs of the OR gate 206, so that a high prediction gain in either of the channels is considered to indicate the presence of a tone. The other items 100–303 of FIG. 7 are not shown in FIG. 8 as they are unchanged.

What is claimed is:

1. A voice activity detector for detecting the presence of speech in an input signal which comprises a noise component, said detector comprising:
   (a) means for storing an estimate of the noise component of an input signal;
   (b) means for recognizing a spectral similarity of the input signal and the stored estimate to produce an output decision signal;
   (c) means for updating the stored estimate;
   (d) an auxiliary detector arranged to indicate the absence of speech from the input signal and control the means for updating so that updating occurs only when speech is indicated by the auxiliary detector to be absent from the input signal;
   (e) means operable to calculate a prediction gain for the input signal; and
   (f) modifying means arranged to suppress said updating of the stored estimate in the event that the prediction gain exceeds a threshold value.

2. A voice activity detector according to claim 1 in which the auxiliary detector includes a voiced speech detector responsive to signals derived from a Linear Predictive Coding residual signal.

3. A voice activity detector according to claim 1 in which the prediction gain represents the prediction gain of a Linear Predictive Coding prediction of 6th order or less.

4. A voice activity detector according to claim 3 in which the prediction gain represents the prediction gain of a Linear Predictive Coding prediction of 4th order or less.

5. A voice activity detector according to claim 1 further including means for detecting one or more primary frequency components of the input signal, and means operable to compare the frequencies with a predetermined threshold and to permit suppression of said updating of the stored estimate only when said primary frequency component exceeds the threshold.

6. A voice activity detector according to claim 1 in which the prediction gain calculation means is preceded by a filter to remove an upper portion of the frequency range of the input signal, the gain calculation being performed only for frequency components lying within the passband of the filter.

7. A voice activity detector according to claim 6 having two filters having respective passbands and respective gain calculation means to calculate gain parameters for the respective passbands, the modifying means being arranged to suppress the updating of the stored estimate in the event that the prediction gain within either passband exceeds a threshold value.

8. A voice activity detector according to claim 6 including means for subsampling a signal produced by the filter.

9. A voice activity detector according to claim 1 wherein said input signal includes signalling tones and the prediction gain exceeding a threshold value indicates the detection of signalling tones in the input signal and causes the modifying means to suppress the updating of the stored estimate.

10. A method for detecting the presence of speech in an input signal which includes a noise component, said method comprising:
   (a) storing an estimate of the noise component of an input signal;
   (b) recognizing a spectral similarity of the input signal and the stored estimate to produce an output decision signal;
   (c) updating the stored estimate;
   (d) using an auxiliary detector arranged to indicate the absence of speech from the input signal and control the updating step so that updating occurs only when speech is indicated by the auxiliary detector to be absent from the input signal;
   (e) generating a prediction gain for the input signal; and
   (f) suppressing said updating of the stored estimate in the event that the prediction gain exceeds a threshold value.

11. A method as in claim 10 in which the auxiliary detector uses a voiced speech detector responsive to signals derived from a Linear Predictive Coding residual signal.

12. A method as in claim 10 in which the prediction gain represents the prediction gain of a Linear Predictive coding prediction of 6th order or less.

13. A method as in claim 12 in which the prediction gain represents the prediction gain of a Linear Predictive Coding prediction of 4th order or less.

14. A method as in claim 10 further including:
   detecting one or more primary frequency components of the input signal, and comparing the frequencies with a predetermined threshold and to permit suppression of said updating of the stored estimate only when said primary frequency component exceeds the threshold.

15. A method as in claim 10 in which the prediction gain calculation is preceded by filtered removal of an upper portion of the frequency range of the input signal, the gain calculation being performed only for frequency components lying within the passband of the filter.

16. A method as in claim 15 wherein two filters are used having respective passbands and respective gain calculation means to calculate gain parameters for the respective passbands, the modifying step suppressing the updating of the stored estimate in the event that the prediction gain within either passband exceeds a threshold value.

17. A method as in claim 15 including subsampling a signal produced by the filter.

18. A method as in claim 10 wherein said input signal includes signalling tones and the prediction gain exceeding a threshold value indicates the detection of signalling tones in the input signal and causes the modifying step to suppress the updating of the stored estimate.

* * * * *

UNITED STATES PATENT AND TRADEMARK OFFICE
CERTIFICATE OF CORRECTION

| | |
|---|---|
| PATENT NO. | : 5,749,067 |
| DATED | : May 5, 1998 |
| INVENTOR(S) | : Barrett |

It is certified that error appears in the above-identified patent and that said Letters Patent is hereby corrected as shown below:

Title page,
Item [63] should read -- Continuation-in-part of Serial No. 08/158,852, filed November 29, 1993, abandoned, which is a continuation-in-part of Serial No. 08/232,475, filed April 25, 1994, abandoned. --

Signed and Sealed this

Twenty-third Day of October, 2001

Attest:

*Nicholas P. Godici*

NICHOLAS P. GODICI
*Attesting Officer    Acting Director of the United States Patent and Trademark Office*